C. F. BLACK.
STARCH SHOVEL.
APPLICATION FILED DEC. 30, 1909.
1,007,912.
Patented Nov. 7, 1911.
5 SHEETS—SHEET 1.
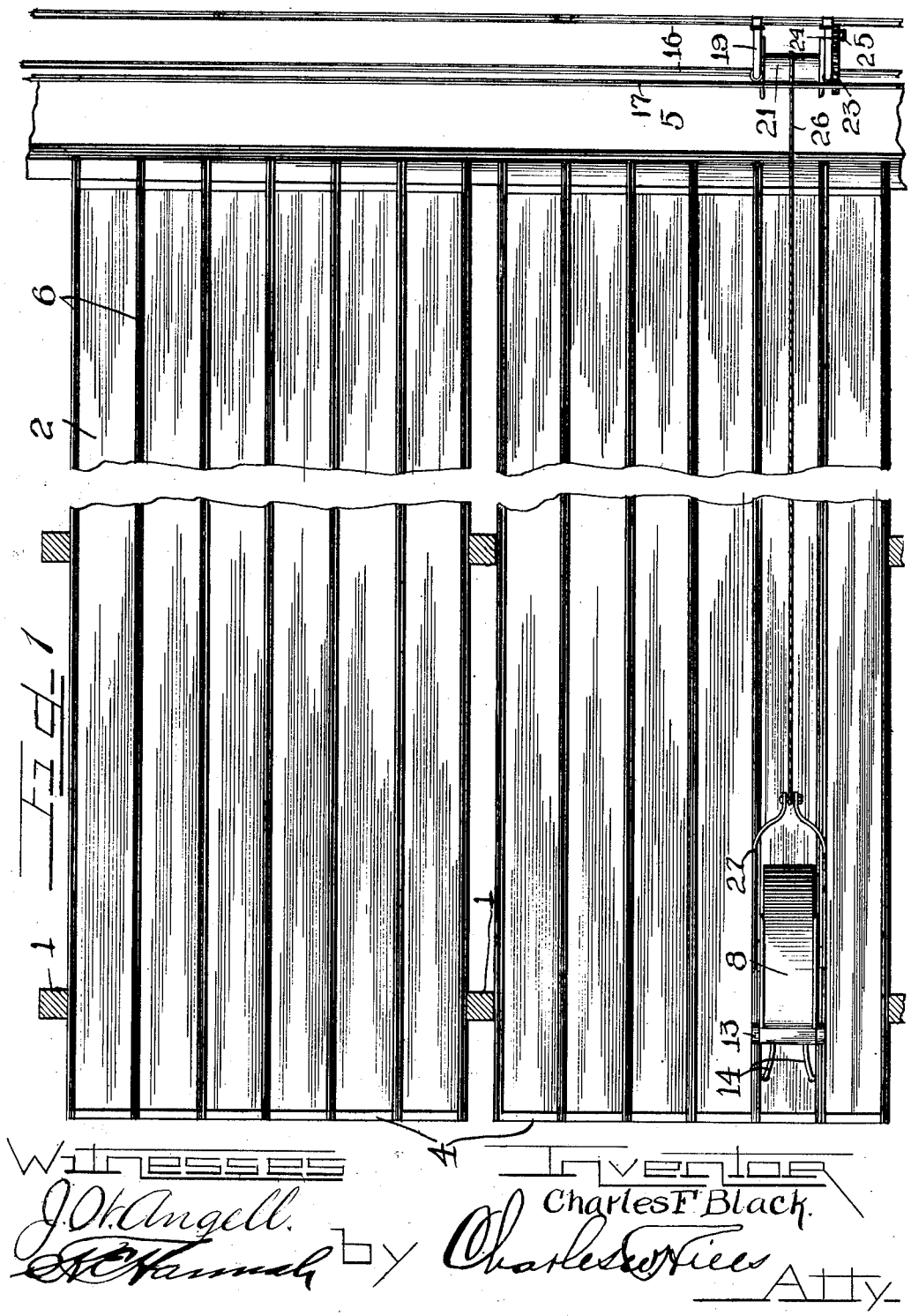

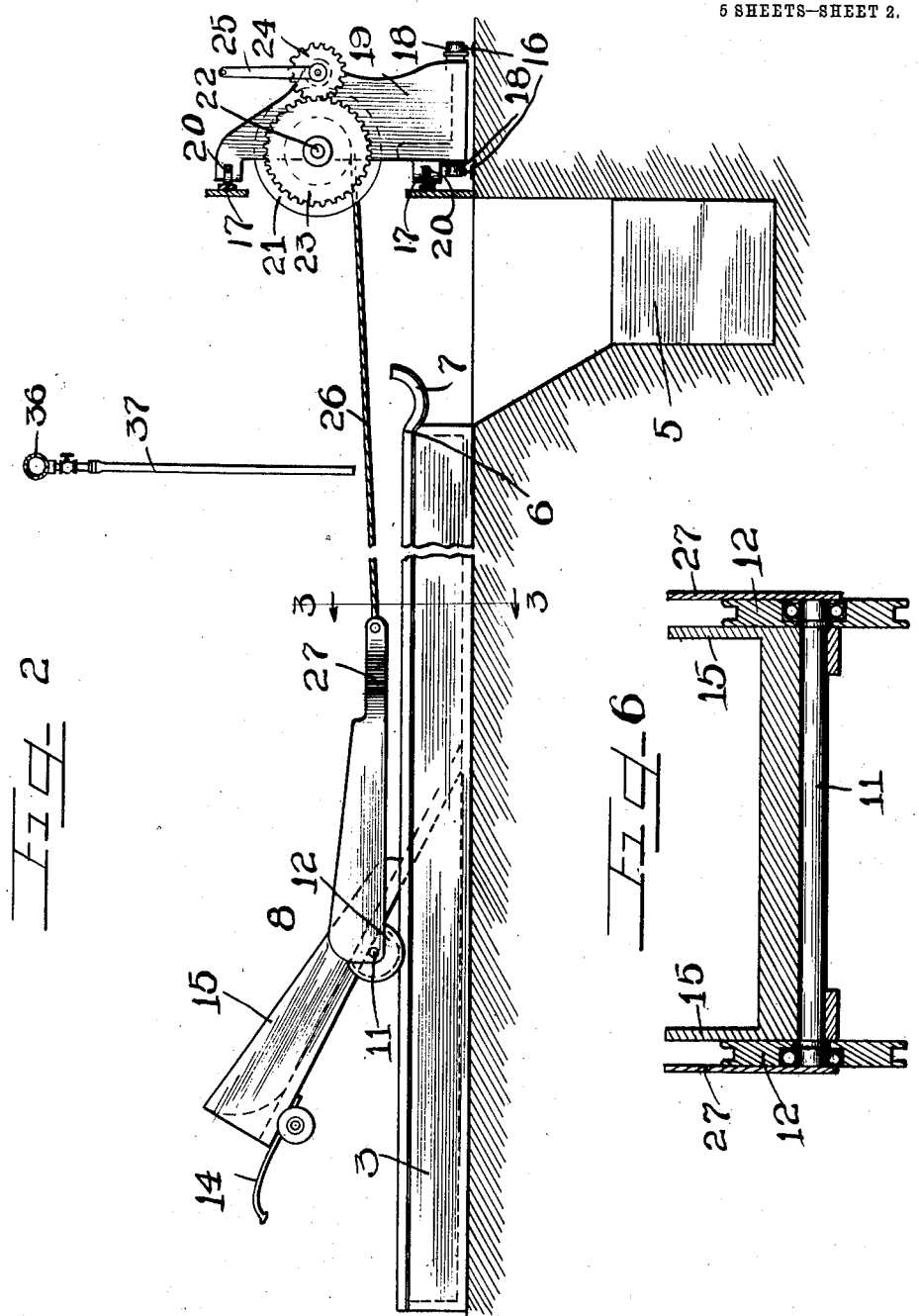

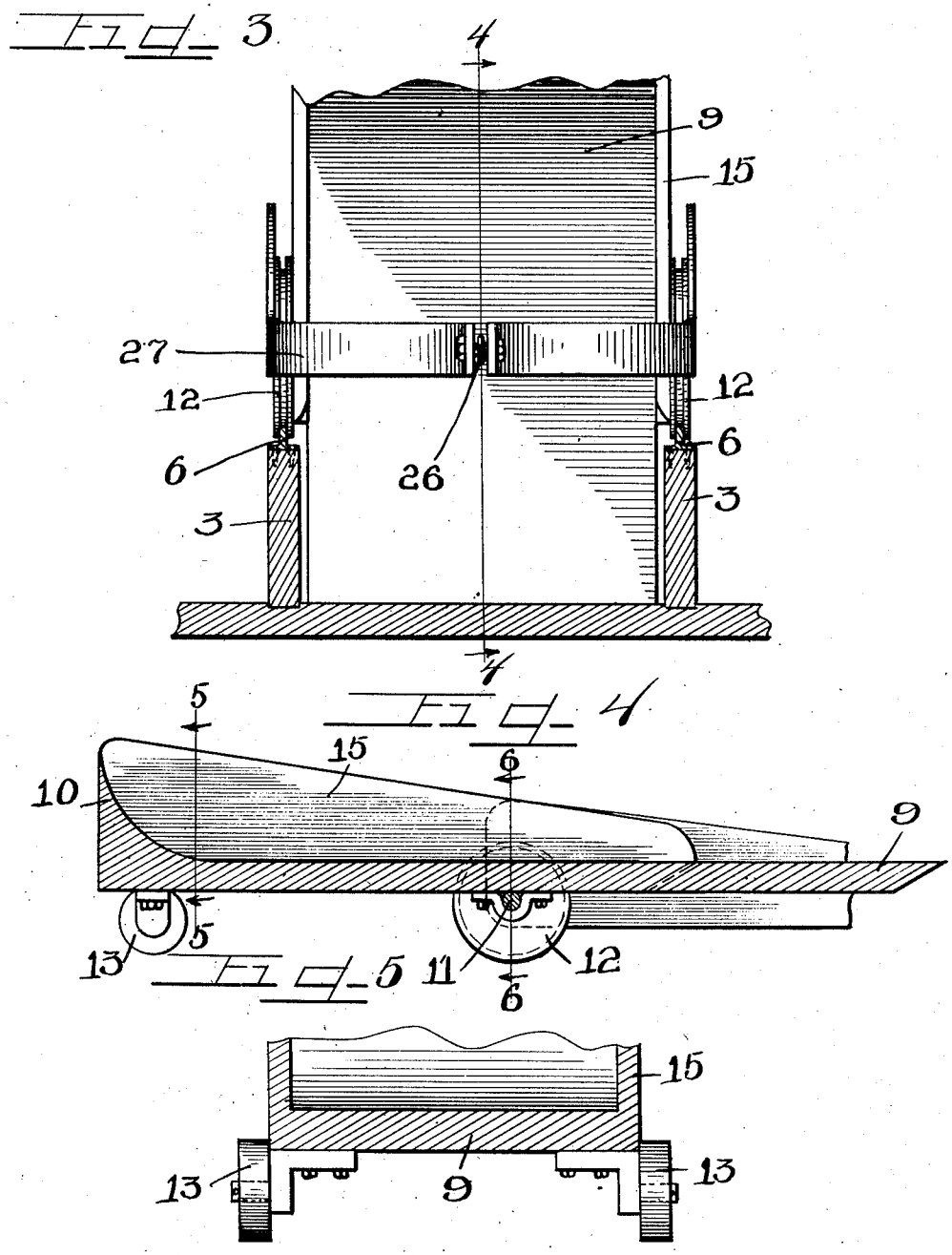

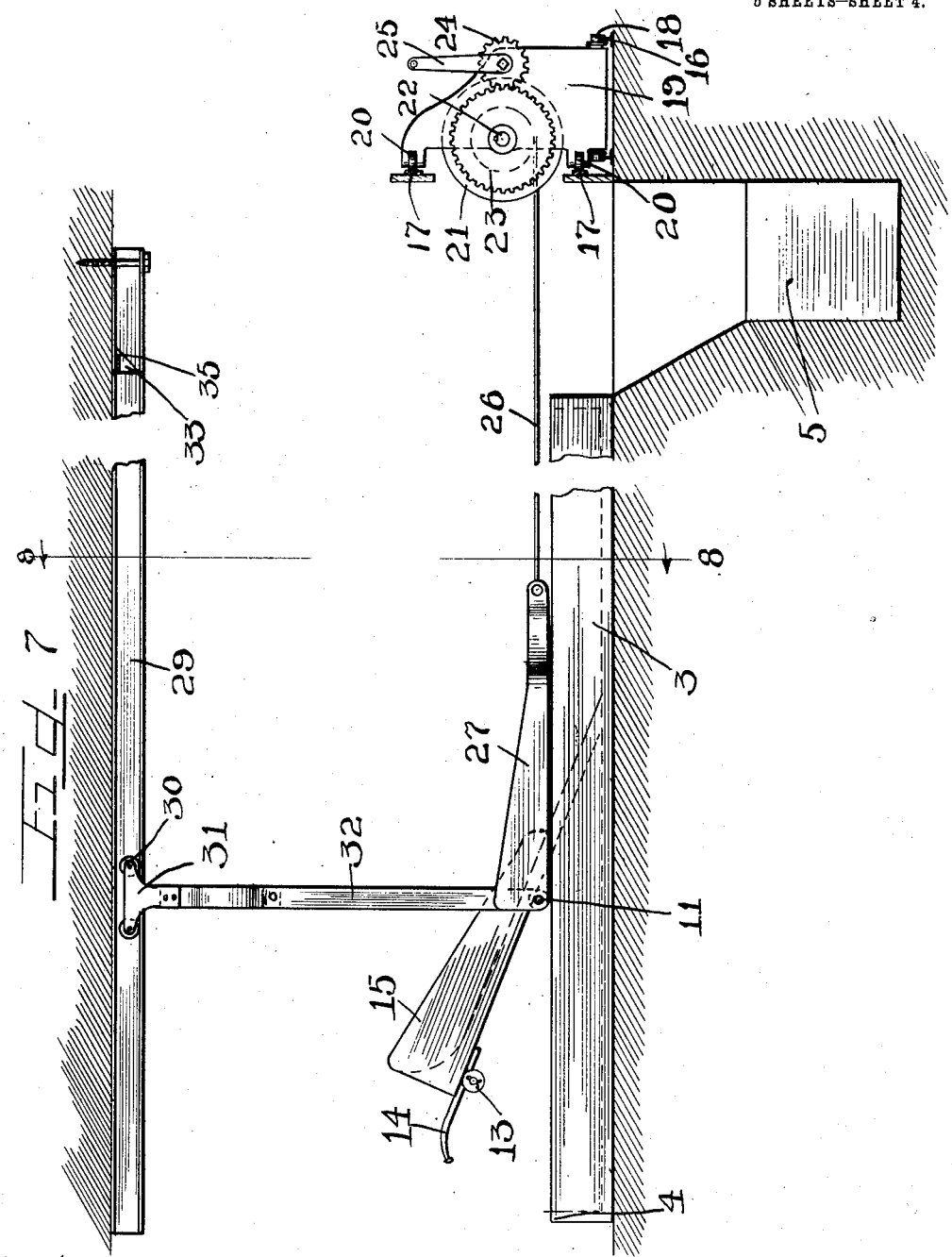

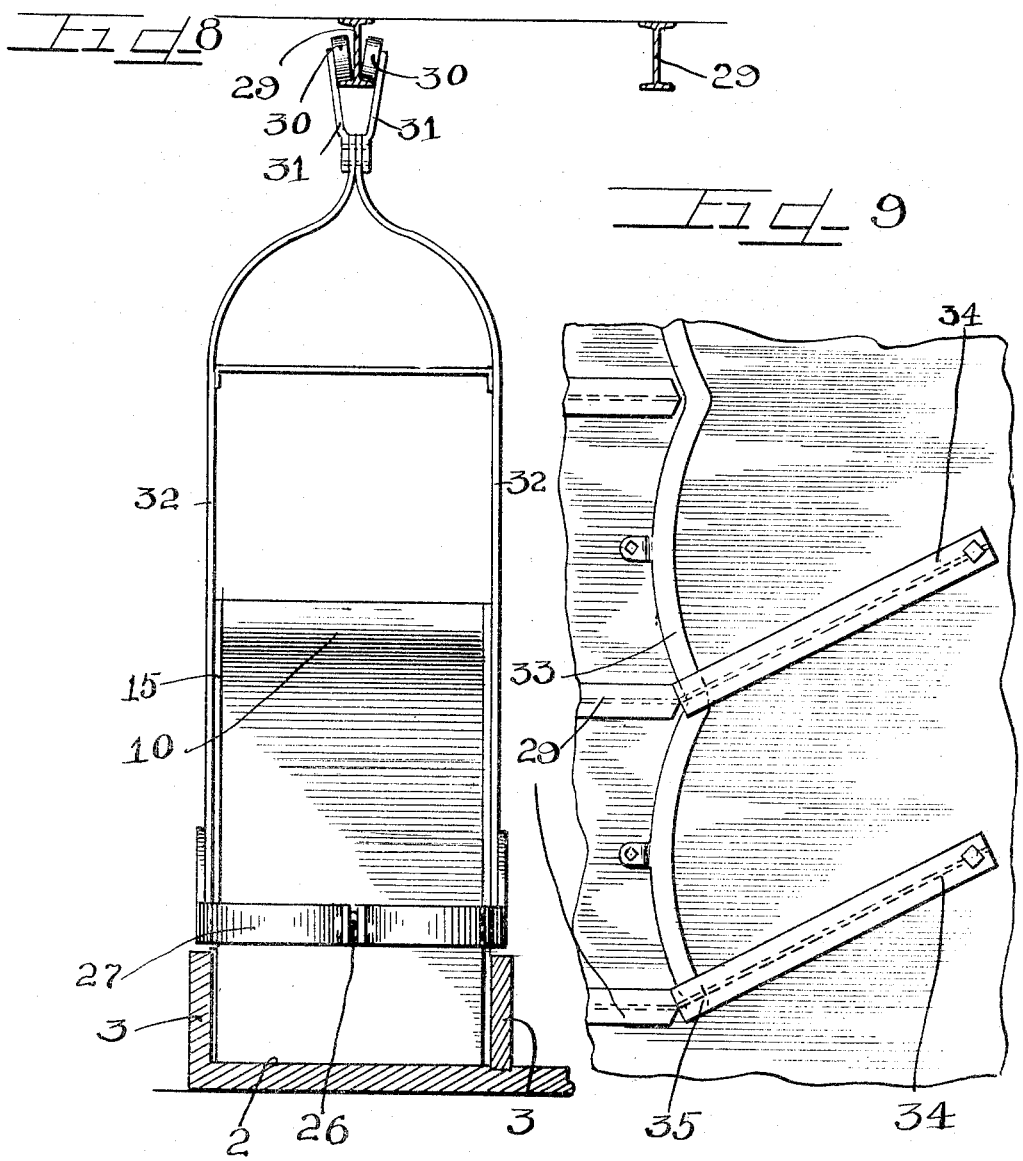

UNITED STATES PATENT OFFICE.

CHARLES F. BLACK, OF WAUKEGAN, ILLINOIS.

STARCH-SHOVEL.

1,007,912.          Specification of Letters Patent.        Patented Nov. 7, 1911.

Application filed December 30, 1909. Serial No. 535,713.

*To all whom it may concern:*

Be it known that I, CHARLES F. BLACK, a citizen of the United States, and a resident of the town of Waukegan, county of Lake, and State of Illinois, have invented certain new and useful Improvements in Starch-Shovels; and I do hereby declare that the following is a full, clear, and exact description of the same, reference being had to the accompanying drawings, and to the numbers of reference marked thereon, which form a part of this specification.

In the manufacture and preparation of starch, the starch water of suitable consistency is delivered into elongated settling troughs or tanks, a number of which are arranged on the same floor and when the process of settling has progressed sufficiently, the starch is shoveled therefrom into laterally arranged conveyers from whence it is delivered to the tanks for further operation, treatment or packaging. Heretofore, the starch has been shoveled or removed from the tanks or troughs manually. This requires many men in proportion to the amount of starch manufactured, and of course, entails large expense and wastes much time. Furthermore, owing to the necessity of installing the laterally disposed conveyers, a large amount of space available for the tanks is consumed and in consequence a much larger floor is required than is true where such lateral conveyers may be dispensed with.

The object of this invention is to provide a shovel adapted to operate successively in said tanks or troughs and by the use of which two men may accomplish the work of emptying said troughs of the accumulated starch in lieu of the greater number of men heretofore required, and furthermore may be enabled to accomplish the same much quicker.

It is further an object of the invention to afford a construction whereby the conveyers heretofore laterally disposed with reference to said tanks or troughs are dispensed with and the starch is delivered from each tank or trough directly to a receptacle or conveyer as preferred, extending along transversely the ends of all the troughs.

It is also an object of the invention to afford in connection with a starch shovel of the class described a winch for actuating the same adapted to be movable transversely said tanks and to operate with equal facility in removing the contents from any of the same.

The invention consists in the matters hereinafter described and more fully pointed out and defined in the appended claims.

In the drawings: Figure 1 is a fragmentary top plan view of a starch floor having the tanks or troughs therein arranged in close relation and without the lateral conveyers. Fig. 2 is a fragmentary side elevation of the same. Fig. 3 is an enlarged fragmentary section on line 3—3 of Fig. 2. Fig. 4 is a section on line 4—4 of Fig. 3. Fig. 5 is a fragmentary section on line 5—5 of Fig. 4. Fig. 6 is a fragmentary section on line 6—6 of Fig. 4. Fig. 7 is a fragmentary side elevation illustrating a slightly different method of suspension and support for the shovel. Fig. 8 is an enlarged section on line 8—8 of Fig. 7. Fig. 9 is an enlarged fragmentary bottom plan view of the track construction permitting the device to be switched from one tank or trough to the adjacent tank or trough.

As shown in the drawings: 1, indicates the posts or center supports for a building, the spaces between which may be termed the starch floors and arranged between and filling the spaces from post to post are the troughs 2, of requisite width and considerable length, which are provided, as shown, with side walls 3, and at the rear and lower end with an end wall 4. Arranged transversely said troughs at their higher or discharge ends is an elongated trough or tank 5, into which the starch from said tanks or troughs is discharged. Arranged on the side walls 3, of each of said troughs is a track rail 6, which, in the construction shown, is a T rail and extends the entire length of each trough, and in the construction shown in Fig. 2, the end 7, thereof over the receptacle or tank 5, is curved downwardly and then upwardly at the extremity to afford a downward drop and then a stop for the shovel. Movable on said track rails is a shovel 8, having a bottom or floor 9, which is open at its front end and shaped when inclined downwardly into the trough, to afford a sharp cutting edge, to engage beneath the starch. At its rear end said bottom curves upwardly, as shown at 10, to break the starch as the shovel slides beneath the same. Journaled upon a suitable axle 11, beneath said bottom and at each side thereof are grooved track wheels 12, which engage on said tracks and on which said shovel is supported, and journaled at the rear end of said shovel and also adapted to roll on said tracks are smaller wheels 13. Handles 14, are also engaged on the rear end of the shovel to permit an operator walking in the trough to support the shovel, as shown in Fig. 2, to lift the starch from the trough.

Side walls 15, are provided on each side the shovel and extend a sufficient distance above the same to suit the capacity of the shovel. As shown, the shovel is actuated by a winch positioned on the opposite side of the trough receptacle or conveyer 5, from the troughs 2. For this purpose, as shown, parallel bracket rails 16, are provided along said tank or receptacle 5, on the side thereof opposite the end of the trough 2, and likewise track rails 17, are arranged one above the other on the same side of the receptacle and movable along said tracks 16, on the track wheels 18, is a winch 19. Secured on the frame of said winch 19, also are wheels 20, to engage on the track rails 17, to afford a support for the winch against draft on said shovel. The barrel 21, of the winch is journaled in the winch frame and on the protruding end of the shaft 22, therefor is rigidly secured a gear 23, which meshes with a pinion 24, adapted to be actuated by a crank 25, or by any suitable source of power, as, for instance, a motor, which may be supported upon the winch and may be actuated by current from any convenient source. The line or cable 26, from said barrel engages centrally on a bail 27, which engages the ends of the axle 11, for the front track wheels of the shovel. In the construction illustrated in Figs. 7, 8, and 9, the winch with its tracks is constructed as before described, as is also the shovel and the bail therefor, excepting that the front track wheels for said shovel are omitted and likewise the track rails on the side walls of the troughs. In lieu of said side rails an I beam 29, is secured on the ceiling or otherwise immediately above the center of each trough and extending longitudinally therewith and tracking on the lower flanges thereof are wheels 30, from which depend hangers 31, from which depends a yoke 32, the lower ends of the arms of which engage on the axle 11. As shown, each of said hangers is provided with two such track wheels on each side the I beam, thus affording a short upper supporting truck for the shovel.

As shown, segment bars 33, are provided between the ends of adjacent I beam rails over the receptacle 5, and pivoted intermediate the track rails 29, are relatively short switch rails 34, also constructed from sections of I beams and each provided with a tongue 35, which engages over the segment rails 33, and permit the otherwise free ends of said switch rails to be swung from the end of one of said I beams 29, to the next adjacent.

The operation is as follows: The troughs are filled from the discharge pipe 36, with which is connected a nozzle 37, controlled by a suitable valve and by means of which the starch of proper consistency is delivered into the respective troughs. From the point of inlet the starch flows downwardly filling the trough to the desired depth and the water from which the starch is deposited (should any remain after the deposition and crystallization of the starch) may be drawn off. When the starch in the trough has acquired the proper condition the work of discharging the contents to the respective tank or receptacle 5, begins. For this purpose the winch is positioned suitably with reference to the trough to be discharged, as shown in Fig. 1, and the shovel is started by an operator who walks in the trough and beginning near the end thereof elevates the rear end of the shovel by means of the handle 14, the draft on the cable 26, is exerted by the assistant at the winch crank 25, or by means of a suitable motor which may be controlled by the shovel man. When the shovel is filled with the starch scaled from the bottom of the trough the rear end of the shovel may be dropped upon the rails in which position it operates as a truck to carry the starch to discharge position, at which point owing to the drop in the rails in the construction shown in Fig. 2, the starch readily slides from the shovel as the rear end is elevated. The shovel is then returned to starting position until all the starch is removed from that particular trough. The operation is continued for the next trough and those succeeding in order, in which instance the winch, is moved along its tracks to draw the cable fair upon the drum. When one trough is emptied, the shovel (which is comparatively light) is elevated by the shovel man to the track of the next succeeding trough—thus the troughs are emptied in order until the work is completed.

In the construction illustrated in Figs. 7, 8, and 9, the winch operates as before described as does also the shovel with the exception that instead of supporting the same upon a track at each side of each trough, the overhead track and supporting bail or yoke is employed. When the trough has been emptied the truck supporting the shovel is run out upon the appropriate switch rail 34, the movable end of the switch rail with the shovel supported thereon is swung upwardly on the track 33, to permit the shovel to be run upon the next succeeding rail after which the operation continues as before for that trough. In this manner the work continues progressively until all the troughs are discharged into the receptacle.

Of course, I am aware that various details of the construction may be modified without departing from the principles of this invention, inasmuch as I have attempted to show but the simplest of several different embodiments of my invention. I therefore do not purpose limiting this application for patent otherwise than necessitated by the prior art.

I claim as my invention:

1. A device of the class described embracing in combination with containing troughs, a winch movable transversely thereof and positioned at one end of the same, a track parallel with the trough, a shovel movable on said track and having at its front end a cutting edge and at its rear end an upwardly curved bottom, wheels journaled at the rear end of said shovel and a cable connecting the winch and shovel.

2. A device of the class described embracing the combination with a series of parallel troughs and a receiving tank arranged transversely thereof at the ends of the same, of a winch movable alongside the receiving receptacle and transversely said troughs, means for operating the winch, a cable leading therefrom, a shovel fitting within the trough and connected with the cable, a cutting blade secured to the front edge of the shovel, and a track for supporting the shovel when in operation.

3. A machine of the class described embracing a parallel series of elongated troughs, a receiving trough or receptacle extending transversely thereof at the discharge ends of the same, a track extending alongside said receiving trough, a winch movable on the track, upper and lower track rails arranged between the winch and the ends of said troughs, wheels on the winch to roll on said track rails, means for operating the winch, a positively supported shovel adapted for operation in any of said troughs, and a bail connected with said shovel and connected with the cable of the winch.

4. In a device of the class described, the combination with a plurality of troughs, a track for each trough, a shovel movable upon said track rails, truck wheels at the rear of said shovel adapted to support the same when loaded, track wheels at the front end of said shovel adapted to normally support the same, a winch movable transversely of said troughs, means for operating said winch and a cable leading therefrom and secured to the shovel.

5. In a starch removing mechanism the combination with a plurality of troughs and a receiving tank arranged transversely thereof, of a track extending alongside said receiving trough, a winch movable upon the track, upper and lower track rails between the winch and tank, wheels on the winch to roll on said track rails, means for operating the winch, a wheeled shovel having a sharp front cutting edge and an upwardly curved rear end, and a bail secured to said shovel and connected with the cable of the winch.

6. In a device of the class described a shovel comprising a bottom curved upwardly at its rear end and having a front cutting edge, side walls one each side of the shovel, an axle secured beneath the bottom and near the center thereof, grooved track wheels journaled on the axle, truck wheels journaled at the rear of said bottom, and rearwardly directed handles secured to said bottom adapted to permit the operator to support the rear end of the shovel while in operation.

7. In a device of the class described a plurality of troughs, a track on the top of the side members of the troughs, a shovel having an upwardly curved bottom and a front cutting edge, wheels to support the shovel on the tracks and mechanism for operating the shovel longitudinally of the troughs to dump the contents of the troughs.

8. In a starch dumping apparatus, the combination with the starch troughs of a starch shovel supported above the troughs and having an upwardly curved rear end and a sharp front cutting edge, mechanism for actuating the starch shovel for removing the starch from the troughs, means for dumping the shovel, and mechanism for shifting said shovel from one trough to another.

9. In a device of the class described the combination with starch troughs, a track extending transversely of the troughs, a winch on said track adapted to be adjusted in front of any trough, a shovel connected with the winch adapted for dumping the starch from all troughs, and means for shifting the shovel from one trough to another.

10. In a dumping apparatus, the combination with the parallel troughs of a shovel supported above the troughs, a track extending transversely of said troughs, a winch on said track for actuating the shovel to remove material from the troughs and means for dumping the shovel.

11. In a dumping apparatus, the combination with troughs of a shovel supported above the troughs and fitting closely therein, a track extending transversely of the troughs, a winch on said track adapted to be placed in front of any trough to actuate the shovel to remove material from the troughs, means for dumping the shovel, and mechanism for shifting said shovel from one trough to another.

12. A device of the class described embracing a plurality of parallel troughs, a receiving trough or receptacle extending transversely thereof at the discharge ends of the same, tracks extending alongside the entire length of each of the parallel troughs and having one of their ends curved downwardly and then upwardly to afford a downward drop and then a stop above the receiving trough, and a shovel movable on said track to remove the material from the troughs and dump the same in the receiving trough when the shovel strikes the stop on the ends of the track.

In testimony whereof I have hereunto subscribed my name in the presence of two subscribing witnesses.

CHARLES F. BLACK.

Witnesses:
K. E. HANNAH,
LAWRENCE REIBSTENE.